US012750095B2

(12) United States Patent
Huang et al.

(10) Patent No.: US 12,750,095 B2
(45) **Date of Patent: *Sep. 29, 2026**

(54) METHODS, DISTRIBUTED BASE STATION SYSTEM, REMOTE RADIO UNIT AND BASE BAND UNIT SYSTEM FOR HANDLING UPLINK SIGNALS

(71) Applicant: Telefonaktiebolaget LM Ericsson (publ), Stockholm (SE)

(72) Inventors: Yezi Huang, Täby (SE); Chenguang Lu, Sollentuna (SE); Miguel Berg, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

This patent is subject to a terminal disclaimer.

(21) Appl. No.: 18/954,473

(22) Filed: Nov. 20, 2024

(65) Prior Publication Data

US 2025/0080170 A1 Mar. 6, 2025

Related U.S. Application Data

(63) Continuation of application No. 18/330,274, filed on Jun. 6, 2023, now Pat. No. 12,160,284, which is a (Continued)

(51) Int. Cl.
*H04B 7/024* (2017.01)
*H04B 7/0456* (2017.01)
(Continued)

(52) U.S. Cl.
CPC ........... *H04B 7/024* (2013.01); *H04B 7/0456* (2013.01); *H04B 7/0617* (2013.01); *H04L 5/0048* (2013.01)

(58) Field of Classification Search
CPC .... H04B 7/024; H04B 7/0456; H04B 7/0617; H04L 5/0048
See application file for complete search history.

(56) References Cited

U.S. PATENT DOCUMENTS

2015/0124688 A1 5/2015 Xu et al.
2015/0256233 A1 9/2015 Ou et al.
(Continued)

OTHER PUBLICATIONS

"XRAN Fronthaul Working Group, While Paper," 2018, 11 pages, XRAN-FH.WP.O-v01.00, xRAN.org.
(Continued)

*Primary Examiner* — Vineeta S Panwalkar
(74) *Attorney, Agent, or Firm* — Nicholson De Vos Webster & Elliott LLP

(57) ABSTRACT

A method performed by a distributed base station system of a wireless communication network. The distributed base station system comprises a base band unit (BBU) and a remote radio unit (RRU) connected to each other over a fronthaul link. The method comprises receiving uplink signals at N antennas of the RRU from a number of user equipment (UEs) connected to the RRU. The BBU determines first beamforming weights based on a first reference signal that is has received from the UEs and sends the first beamforming weights to the RRU. The RRU then determines intermediate signals from the first beamforming weights and the uplink signals and sends the intermediate signals to the BBU. The BBU then determines second beamforming weights from a second reference signal it has received from the RRU. Then, the BBU determines an output signal based on the intermediate signal and the second beamforming weights.

20 Claims, 9 Drawing Sheets

Related U.S. Application Data continuation of application No. 17/595,769, filed as application No. PCT/SE2019/050480 on May 24, 2019, now Pat. No. 11,736,152.

(51) Int. Cl.
*H04B 7/06* (2006.01)
*H04L 5/00* (2006.01)

(56) References Cited

U.S. PATENT DOCUMENTS

| | | | |
|---|---|---|---|
| 2018/0138957 | A1 | 5/2018 | Wang et al. |
| 2018/0302248 | A1 | 10/2018 | Ye et al. |
| 2020/0389880 | A1 | 12/2020 | Lu et al. |

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)," Mar. 2017, 91 pages, 3GPP Organizational Partners.
Corrected Notice of Allowability, U.S. Appl. No. 17/595,769, Jul. 6, 2023, 2 pages.
Examination Report, AU Application No. 2019447734, Feb. 23, 2023, 2 pages.
Examination Report, AU Application No. 2019447734, Oct. 24, 2022, 2 pages.
Examination Report, AU Application No. 2019447734, Sep. 9, 2022, 5 pages.
International Preliminary Report on Patentability, PCT App. No. PCT/SE2019/050480, Dec. 2, 2021, 19 pages.
International Search Report and Written Opinion for Application No. PCT/SE2019/050480, dated Jan. 27, 2020, 21 pages.
Non-Final Office Action, U.S. Appl. No. 18/330,274, Mar. 21, 2024, 9 pages.
Notice of Acceptance, AU Application No. 2019447734, Mar. 27, 2023, 3 pages.
Notice of Allowance, U.S. Appl. No. 17/595,769, Mar. 6, 2023, 10 pages.
Notice of Allowance, U.S. Appl. No. 18/330,274, Jul. 26, 2024, 5 pages.

METHODS, DISTRIBUTED BASE STATION SYSTEM, REMOTE RADIO UNIT AND BASE BAND UNIT SYSTEM FOR HANDLING UPLINK SIGNALS

CROSS-REFERENCE TO RELATED APPLICATIONS

This application is a continuation of U.S. application Ser. No. 18/330,274, filed Jun. 6, 2023, which is a continuation of U.S. application Ser. No. 17/595,769, filed Nov. 23, 2021 (now U.S. Pat. No. 11,736,152 issued Aug. 22, 2023), which is a National stage of International Application No. PCT/SE2019/050480, filed May 24, 2019, which are all hereby incorporated by reference.

TECHNICAL FIELD

The present disclosure relates generally to methods, remote radio units, and base band unit systems of distributed base stations, as well as distributed base station systems for handling uplink signals. More specifically, the present disclosure deals with such methods, units and systems when the remote radio unit has a plurality of antennas for receiving uplink signals, such as in Multiple Input Multiple Output (MIMO) systems. The present disclosure further relates to computer programs and carriers corresponding to the above methods, units and systems.

BACKGROUND

In a centralized radio access network (C-RAN), also called a distributed base station system, radio access network (RAN), processing is conducted by two separate units: a remote radio unit (RRU), and a base band unit (BBU). The BBU is connected to the RRU via a fronthaul link. The RRU may also be called Radio Unit (RU) and the base band unit may also be called base unit (BU). The RRU is connected to one or more antennas through which the RRU wirelessly communicates with at least one user equipment (UE). The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission (CoMP), to increase the spectrum efficiency and network capacity, as well as baseband processing, whereas the RRUs perform radio frequency (RF) processing and transmission/reception of the RF processed signals. Such a split of base station functionality between BBU and RRU is called a physical layer-radio frequency (PHY-RF) split.

Originally, the RRU was designed to reduce the cable loss of the coax cables between an antenna tower top where the actual antennas are situated and the bottom of the antenna tower where the base station functionality is hosted. Therefore, before $5^{th}$ Generation of mobile communication (5G), i.e. at 4G, e.g. Long Term Evolution (LTE), the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output (MIMO) in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N»K. e.g., N is 64, 128 or 256 while K is 8 or 16. As shown, the number of antennas are quite large. Massive MIMO is often referred to as massive beamforming, which is able to form narrow beams and focus on different directions. It also benefits multi-user MIMO, which allows the transmissions from/to multiple UEs simultaneously over separate spatial channels resolved by the massive MIMO technologies, while keeping high capacity for each UE. To support such massive MIMO solutions, the required fronthaul link capacity needs to increase in proportion to the increase of number of antennas, when using the current PHY-RF split between functionality of BBU and RRU. This will dramatically drive up the fronthaul link costs.

To reduce the required fronthaul (FH) capacity, new functional splits within the physical layer (PHY) are discussed and proposed. Basically, some baseband PHY functions will be moved to the RRU, which mainly performs RF-related operations in the current Common Public Radio Interface (CPRI) based implementation. Two options for intra-PHY split have attracted attention.

- Option 1: transport frequency-domain samples in FH, instead of transporting time-domain samples in CPRI. In this option, RRU needs to perform FFT/IFFT operations to transform between time domain and frequency domain samples. Here, option 1 is referred to as frequency domain FH (fdFH). In fdFH, the number of FH streams still equals the number of antennas. One advantage of fdFH is the possibility that fdFH traffic is proportional to the air interface traffic load. The required peak capacity is still high when traffic is fully loaded.
- Option 2: transport layer samples in FH. It means the MIMO or beamforming processing is done in the RRU. The number of FH streams are reduced to the number layers. For example, if the system is N=64 antennas and K=16 user layers, there are only 16 FH streams going through the FH link. Here option 2 is referred to as layer FH (laFH). This can dramatically reduce the required FH capacity, which is also proportional to traffic load. However, moving the whole MIMO or beamforming processing to RRU increases significantly the complexity of RRU. The system may not be easy to scale up to support more antennas, especially when the beamforming weights are calculated in RRU. It may need to replace the existing RRU to support more antennas. It may also limit the joint-MIMO-processing possibility for coordinating multiple RRUs at different places.

In "xRAN Fronthaul Working Group White Paper", XRAN-FH.WP.0-v01.00, April 2018 [1] (merged to O-RAN in 2018), a variant of the low layer functional split of option 2 above is selected called option 7-2x. According to this variant, in the uplink (UL), Fast Fourier Transform (FFT), cyclic prefix (CP) removal and digital beamforming functions reside in the RRU. The rest of the PHY functions including resource element de-mapping, equalization, de-modulation, etc., reside in the BBU (referred to as lls-CU in [1]). Beamforming-specific processing, i.e. combining inputs from multiple digital transceivers to a set of beams/layers, resides within the RRU. 7-2x interface scales based on streams or layers proportional to user traffic, which allows using higher number of antennas without increasing FH data traffic. This benefit is enabled by allocating beamforming capability in RRU. Note that beamforming weights increase with more antennas as well.

In xRAN, channel estimation is done in the BBU. The BBU calculates the beamforming weights (or coefficients) based on the channel estimation and then sends the beamforming weights to the RRU that performs the actual beamforming. A problem with such beamforming calculation is that such channel estimation can be outdated. The reason is that the channel estimation is done in the BBU earlier than the time when the beamforming is performed. If the channel has changed during the time due to e.g. UE mobility and/or time-varying interferences from neighboring cells, the beamforming performance is degraded.

Consequently, there is a need for a way to more accurately determine beamforming weights in a distributed base station system.

SUMMARY

It is an object of the invention to address at least some of the problems and issues outlined above. It is another object of embodiments of the invention to balance complexity of the RRU to capacity limitations on the fronthaul. It is possible to achieve at least some of these objects and others by using methods, RRUs, BBU systems and distributed base station systems as defined in the attached independent claims.

According to one aspect, a method is provided performed by a distributed base station system of a wireless communication network. The distributed base station system comprises a BBU and a RRU connected to each other over a fronthaul link. The RRU is connected to N antennas. The method comprises receiving, by the RRU, a first reference signal from a number of UEs wirelessly connected to the RRU, sending, by the RRU, the first reference signal over the fronthaul link to the BBU, determining, by the BBU, information of first beamforming weights W1 based on the first reference signal, and sending, by the BBU, the information of the first beamforming weights W1 over the fronthaul link to the RRU. The method further comprises obtaining, by the RRU, uplink signals y as received at the N antennas from the number of UEs, the N uplink signals y comprising K user-layer signals overlaid with interference signals and noise, the N uplink signals further comprising a second reference signal, determining, by the RRU, intermediate signals $\tilde{y}$ based on the information of the first beamforming weights W1 and on the uplink signals y comprising the second reference signal, the intermediate signals having K+L signal components, where (K+L) is smaller than N, and L is larger than or equal to zero, and sending, by the RRU, the intermediate signals $\tilde{y}$ over the fronthaul link to the BBU. The method further comprises determining, by the BBU, second beamforming weights W2 based on the second reference signal received in the intermediate signal $\tilde{y}$, and determining, by the BBU, output signals r, which are estimations of the K user-layer signals, based on the received intermediate signals $\tilde{y}$ and the second beamforming weights W2.

According to another aspect, a method is provided performed by an RRU of a distributed base station system of a wireless communication network. The distributed base station system further comprises a BBU connected to the RRU over a fronthaul link, and the RRU is connected to N antennas. The method comprises receiving a first reference signal from a number of UEs wirelessly connected to the RRU, and sending the first reference signal over the fronthaul link to the BBU. The method further comprises obtaining uplink signals y as received at the N antennas from the number of UEs, the N uplink signals y comprising K user-layer signals overlaid with interference signals and noise, the N uplink signals further comprising a second reference signal, and receiving, from the BBU, information of first beamforming weights $W_1$ calculated from the first reference signal that the RRU sent to the BBU. The method further comprises determining intermediate signals $\tilde{y}$ based on the information of the first beamforming weights $W_1$ and on the uplink signals y, the intermediate signals having K+L components, where (K+L) is smaller than N, and L is larger than or equal to zero, and sending the intermediate signals $\tilde{y}$ over the fronthaul link to the BBU.

According to another aspect, a method performed by a BBU system of a wireless communication network is provided. The wireless communication network comprises a distributed base station system having a BBU and an RRU connected to the BBU over a fronthaul link. The RRU is further connected to N antennas. The method comprises receiving, from the RRU, a first reference signal that the RRU has received from a number of UEs wirelessly connected to the RRU, determining information of first beamforming weights $W_1$ based on the received first reference signal, and triggering sending of the information of the first beamforming weights $W_1$ over the fronthaul link to the RRU. The method further comprises receiving, from the RRU, intermediate signals $\tilde{y}$ determined by the RRU from the information of the first beamforming weights $W_1$ and from uplink signals y as received by the RRU at the N antennas from the number of UEs, the intermediate signals having K+L components, where (K+L) is smaller than N, and L is larger than or equal to zero, the N uplink signals y comprising K user-layer signals overlaid with interference signals and noise and a second reference signal, determining second beamforming weights $W_2$ based on the second reference signal, and determining output signals r, which are estimations of the K user-layer signals, based on the received intermediate signals $\tilde{y}$ and the second beamforming weights $W_2$.

According to another aspect, a distributed base station system is provided operable in a wireless communication network. The distributed base station system comprises a BBU and an RRU connected to each other over a fronthaul link. The RRU is connected to N antennas. The distributed base station system comprises a processing circuitry and a memory. Said memory contains instructions executable by said processing circuitry, whereby the distributed base station system is operative for receiving, by the RRU, a first reference signal from a number of UEs wirelessly connected to the RRU, and sending, by the RRU, the first reference signal over the fronthaul link to the BBU. The distributed base station system is further operative for determining, by a BBU system, information of first beamforming weights $W_1$ based on the first reference signal and sending, by the BBU, the information of the first beamforming weights $W_1$ over the fronthaul link to the RRU. The distributed base station system is further operative for obtaining, by the RRU, uplink signals y as received at the N antennas from the number of UEs, the N uplink signals y comprising K user-layer signals overlaid with interference signals and noise, the N uplink signals further comprising a second reference signal, and determining, by the RRU, intermediate signals $\tilde{y}$ based on the information of the first beamforming weights $W_1$ and on the uplink signals y comprising the second reference signal, the intermediate signals having K+L signal components, where (K+L) is smaller than N, and L is larger than or equal to zero. The distributed base station system is further operative for sending, by the RRU, the intermediate signals ỹ over the fronthaul link to the BBU, determining, by the BBU system, second beamforming weights $W_2$ based on the second reference signal received in the intermediate signal ỹ, and determining, by the BBU system, output signals r, which are estimations of the K user-layer signals, based on the received intermediate signals ỹ and the second beamforming weights $W_2$.

According to another aspect, an RRU is provided operable in a distributed base station system of a wireless communication network. The distributed base station system further comprises a BBU connected to the RRU over a fronthaul link. The RRU is operable to be connected to N antennas. The RRU comprises a processing circuitry and a memory. Said memory contains instructions executable by said processing circuitry, whereby the RRU is operative for receiving a first reference signal from a number of UEs wirelessly connected to the RRU, and sending the first reference signal over the fronthaul link to the BBU. The RRU is further operative for obtaining uplink signals y as received at the N antennas from the number of UEs, the N uplink signals y comprising K user-layer signals overlaid with interference signals and noise, the N uplink signals further comprising a second reference signal. The RRU is further operative for receiving, from the BBU, information of first beamforming weights $W_1$ calculated from the first reference signal that the RRU sent to the BBU, determining intermediate signals ỹ based on the information of the first beamforming weights $W_1$ and on the uplink signals y, the intermediate signals having K+L components, where (K+L) is smaller than N, and L is larger than or equal to zero, and sending the intermediate signals ỹ over the fronthaul link to the BBU.

According to another aspect, a BBU system is provided operable in a wireless communication network. The wireless communication network comprises a distributed base station system having a BBU and an RRU connected to the BBU over a fronthaul link. The RRU has N antennas. The BBU system comprises a processing circuitry and a memory. Said memory contains instructions executable by said processing circuitry, whereby the BBU system is operative for receiving, from the RRU, a first reference signal that the RRU has received from a number of UEs wirelessly connected to the RRU, determining information of first beamforming weights $W_1$ based on the received first reference signal, and triggering sending of the information of the first beamforming weights $W_1$ over the fronthaul link to the RRU. The BBU system is further operative for receiving, from the RRU, intermediate signals ỹ determined by the RRU from the information of the first beamforming weights $W_1$ and from uplink signals y as received by the RRU at the N antennas from the number of UEs, the intermediate signals having K+L components, where (K+L) is smaller than N, and L is larger than or equal to zero, the N uplink signals y comprising K user-layer signals overlaid with interference signals and noise and a second reference signal. The BBU system is further operative for determining second beamforming weights $W_2$ based on the second reference signal, and determining output signals r, which are estimations of the K user-layer signals, based on the received intermediate signals ỹ and the second beamforming weights $W_2$.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
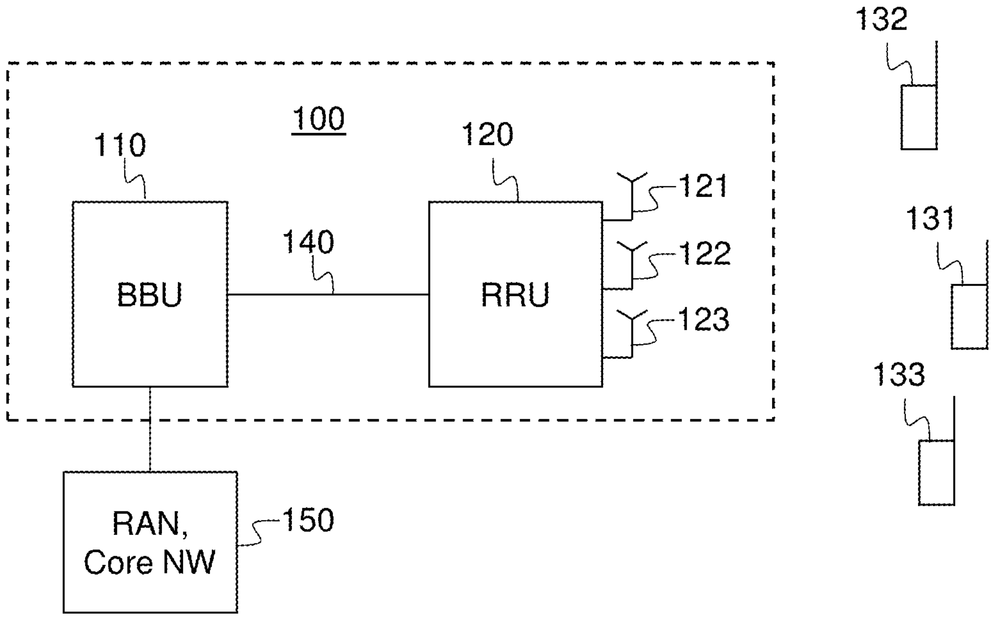
FIG. 1 is a schematic block diagram of a wireless communication system comprising a distributed base station system in which the present invention can be used.

Briefly described, a solution is provided to determine beamforming weights in a distributed base station system in a more accurate way than today. Today, channel estimation is usually performed based on Sounding Reference Signals (SRS) sent from UEs. SRS is scheduled by the BBU periodically or on demand. In other words, the SRS is normally not sent together with the uplink signals. Also, when the BBU performs the channel estimation, calculates the beamforming weights and sends the beamforming weights to the RRU that performs the beamforming on subsequently incoming uplink signals, the beamforming weights could have been calculated on outdated channel information.

A possible solution to such a problem may be to perform channel estimation and determine beamforming weights in the RRU on reference signals sent together with the uplink signals. Demodulation Reference Signals (DMRS) are existing reference signals that are embedded in each time slot together with other signals, e.g. uplink data signals, and therefore are supposed to experience the same channel as the uplink data symbols scheduled in the same time slot. Then the beamforming weights would be calculated on updated channel information and the performance would be improved. However, this increases the RRU complexity significantly since both channel estimation, determination of beamforming weights and beamforming calculation are done in the RRU. Increased RRU complexity results in more expansive RRUs. Also, to perform channel estimation in the RRU would not be compliant to the xRAN standard defined in [1].

Instead, according to an embodiment, we propose to do the channel estimations and calculation of beamforming weights in the BBU, however, the beamforming process is split into two parts, where the first part is performed in the RRU and the second part in the BBU. The first part of the beamforming is based on first beamforming weights sent from the BBU to the RRU. In the BBU, these first beamforming weights are calculated based on channel estimation on a first reference signal sent from the UEs at an earlier time point. The first reference signal may be an SRS. Then the first beamforming is performed in the RRU on a received uplink signal based on the first beamforming weights, and the partly beamformed signal is sent to the BBU. The BBU then performs channel estimation of an effective channel including both the wireless communication channel and the first part of beamforming in RRU, based on a second reference signal that was sent wirelessly in the same time slot as the uplink signal. The second reference signal may be a DMRS. As the second reference signal is sent together with the uplink signal, the second reference signal has been processed by the first part of beamforming before it reaches the BBU. Then the BBU calculates the beamforming weights of the second part, called second beamforming weights, based on the received second reference signal, and perform the second part of the beamforming on the partly beamformed signal it receives from the RRU. In this way, the performance gets improved as the overall beamforming weights are more accurate. This is because the second beamforming part is more accurate as it is based on the current channel represented by the second reference signal, though the first beamforming part may be outdated and thus less accurate.

According to an embodiment, the second part is mainly for interference mitigation, which is more sensitive to channel estimation error.

According to another embodiment, Zero-Forcing (ZF) based beamforming or Minimum Mean Square Error (MMSE)-based beamforming may be performed. In these embodiments, the first part of beamforming in the RRU performs maximum-ratio-combining (MRC) based on the first beamforming weights sent from BBU. In BBU, these first beamforming weights for RRU are calculated with respect to an SRS-based channel estimation. The first beamforming combines signals received from respective antenna element into beams, the number of beams being equal to the number of user layers K. The processed data signals, i.e. after the first beamforming, are then transported to the BBU over the FH interface. The BBU then performs channel estimation of the effective channel, including both the air channel and the first beamforming performed in the RRU, based on the received DMRS, which is already processed by the first beamforming. With respect to the DMRS-based channel estimation, the BBU calculates the second beamforming weights and performs the second beamforming on the received processed data signal, for mitigating the remaining interferences between the user layers.

According to an embodiment, the first beamforming weights can be compressed more to reduce the required data rate for transferring the first beamforming weights over the FH from the BBU to the RRU. For example, only partial weights are transferred, or the data format used to represent the first beamforming weights can use fewer bits.

FIG. 1 illustrates a wireless communication network in which the present invention may be used. The wireless communication network comprises a distributed base station system 100, which in turn comprises a BBU 110 and a RRU 120. The BBU 110 has connections to other base station nodes or other RAN nodes and further to a core network (symbolized with 150 in FIG. 1) so that the distributed base station system can communicate to other nodes of the communication network. The BBU is connected with the RRU via a fronthaul link (FH) 140. The fronthaul link 140 may be any kind of connection, such as a dedicated wireline or wireless connection or a connection via a network, as long as the connection fulfils fronthaul requirements, e.g. in capacity and latency. The RRU further has a plurality of antennas 121, 122, 123 through which wireless signals are communicated towards and from one or more UEs 131, 132, 133. The wireless signals comprise data to be communicated from or to the UEs 131, 132, 133. The BBU 110 and the RRU 120 comprise RAN functionality for handling the data and signals to be communicated between the RRU 120 and the UEs 131, 132, 133. The RAN functionality is distributed between the BBU and the RRU as will be described further down in this disclosure.

The wireless communication network in which the distributed base station 100 is to be used may be any kind of wireless communication network that can provide radio access to wireless communication devices. Examples of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The UEs 131, 132, 133 may be any type of communication device capable of wirelessly communicating with the RRU 120 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
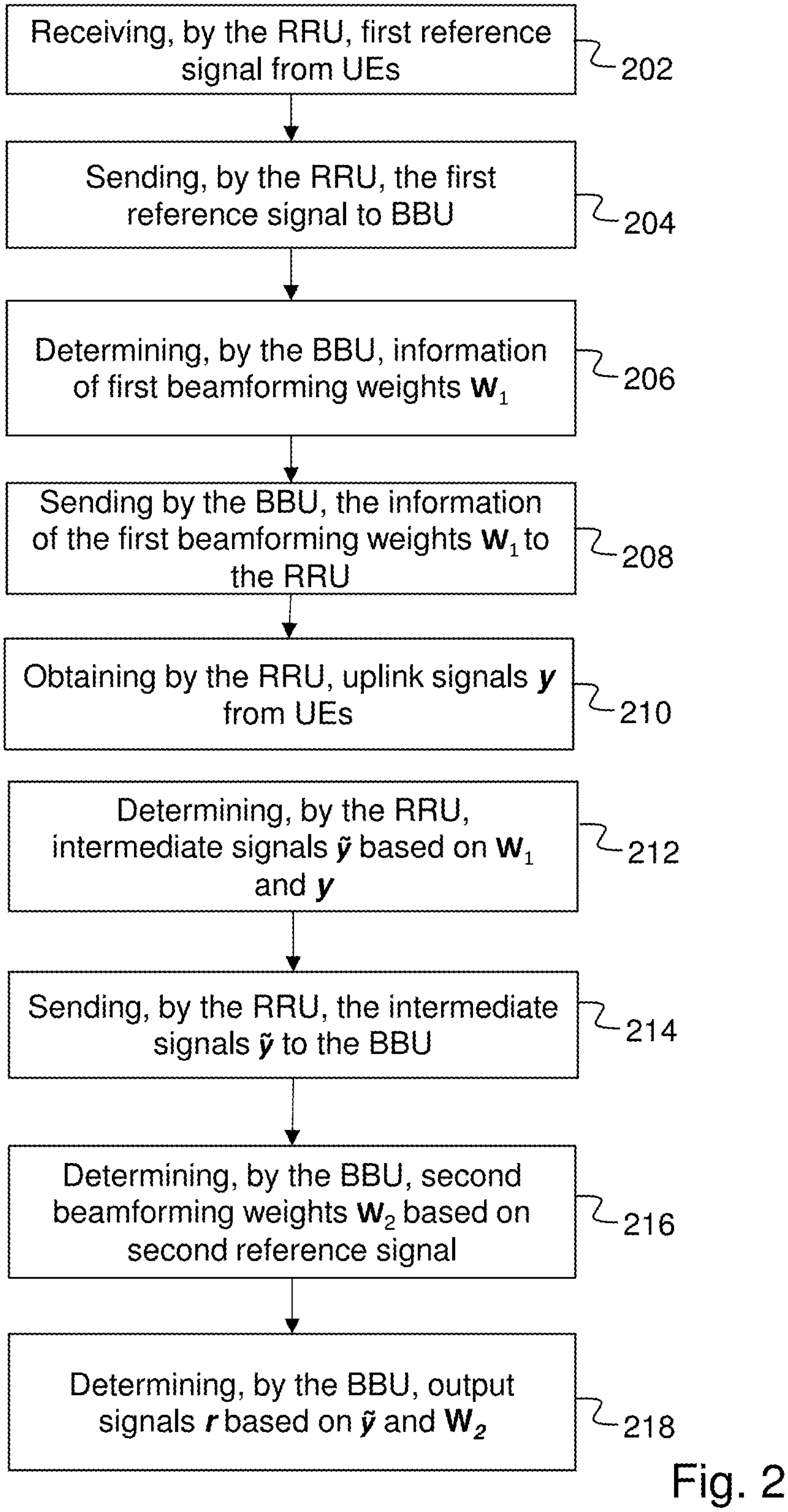
FIG. 2 is a flow chart illustrating a method performed by a distributed base station system, according to possible embodiments.

FIG. 2, in conjunction with FIG. 1, describes a method performed by a distributed base station system 100 of a wireless communication network. The distributed base station system 100 comprises a BBU 110 and a RRU 120 connected to each other over a fronthaul link 140. The RRU 120 is connected to N antennas 121, 122, 123. The method comprises receiving 202, by the RRU, a first reference signal from a number of UEs 131, 132, 133, wirelessly connected to the RRU 120, sending 204, by the RRU, the first reference signal over the fronthaul link 140 to the BBU 110, determining 206, by the BBU 110, information of first beamforming weights W1 based on the first reference signal, and sending 208, by the BBU, the information of the first beamforming weights W1 over the fronthaul link 140 to the RRU 120. The method further comprises obtaining 210, by the RRU, uplink signals y as received at the N antennas 121, 122, 123 from the number of UEs 131, 132, 133, the N uplink signals y comprising K user-layer signals overlaid with interference signals and noise, the N uplink signals further comprising a second reference signal, determining 212, by the RRU, intermediate signals $\tilde{y}$ based on the information of the first beamforming weights W1 and on the uplink signals y comprising the second reference signal, the intermediate signals having K+L signal components, where (K+L) is smaller than N, and L is larger than or equal to zero, and sending 214, by the RRU, the intermediate signals $\tilde{y}$ over the fronthaul link 140 to the BBU 110. The method further comprises determining 216, by the BBU, second beamforming weights W2 based on the second reference signal received in the intermediate signal $\tilde{y}$, and determining 218, by the BBU, output signals r, which are estimations of the K user-layer signals, based on the received intermediate signals $\tilde{y}$ and the second beamforming weights W2.

N signifies at least two antennas. The first beamforming weights $W_1$ are determined based on a channel estimation $\hat{H}$ performed based on the first reference signal as it looks when sent from the UEs and on the first reference signal as it looks when received at the plurality of antennas of the RRU. The channel estimation $\hat{H}$ is an estimation of the wireless communication channel between the number of UEs and the plurality of the antennas of the RRU. Information of the first beamforming weights could be the channel estimation or the actual first beamforming weights. As the uplink signals comprise the second reference signal also the second reference signal is processed in the determination 212 of the intermediate signals. For example, the uplink signal including the second reference signal is multiplied with $W_1$. The second beamforming weights are determined based on a channel estimation of an effective channel including both the wireless communication channel and the first beamforming part performed at the RRU. As the second reference signal is processed in the RRU, it is multiplied by the first beamforming weights in the first beamforming part. The second reference signal can therefore be used for a channel estimation of the effective channel by comparing the second reference signal before being sent from the UEs to the second reference signal as received at the BBU.

By the uplink signals comprising second reference signals and by using those second reference signals to do a second part of the beamforming in the BBU, the output signals r become more accurate estimations of the K user-layer signals than would have been the case if the first reference signal would have been used for all beamforming. This is the case as the first reference signal is sent beforehand, and therefore the first beamforming weights are calculated regarding estimate of channel in the past, while the second reference signal is sent together with the user-layer signals, and therefore the second beamforming weights are based on the current channel. Further, by such a method, beamforming weights are only determined in the BBU, whereby processing power in the RRU is saved. Also, by doing all determination of beamforming weights in the BBU, the method is compliant to the xRAN specification. Also, by determining first beamforming weights in the BBU and the BBU informing the RRU of the first beamforming weights, the RRU can do a first part of the beamforming into intermediate signals that have K+L signal components, which are fewer components than the N uplink signals. As a result, fronthaul link capacity is saved compared to sending the uplink signals over the fronthaul link. Depending on which beamforming algorithm is implemented, the intermediate signals can either contain K components or K+L components, where L can symbolize the number of interfering signals. When L>0, it means that the intermediate signals contain more degrees of freedom than the number of user layers. For example, the second beamforming can utilize the extra degrees of freedom to deal with interferences and channel changes.

Figure 3:
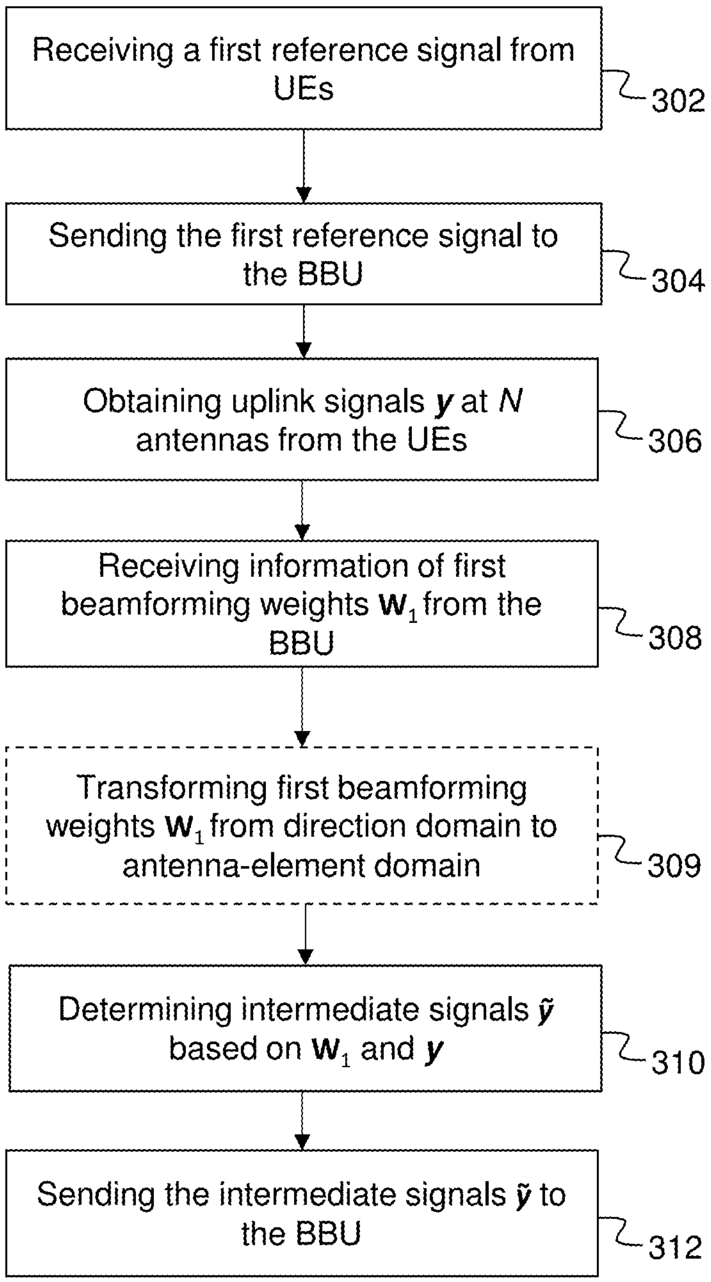
FIG. 3 is a flow chart illustrating a method performed by a RRU, according to possible embodiments.

FIG. 3, in conjunction with FIG. 1, describes a method performed by an RRU 120 of a distributed base station system 100 of a wireless communication network. The distributed base station system 100 further comprises a BBU 110 connected to the RRU over a fronthaul link 140, and the RRU 120 is connected to N antennas 121, 122, 123. The method comprises receiving 302 a first reference signal from a number of UEs 131, 132, 133 wirelessly connected to the RRU, and sending 304 the first reference signal over the fronthaul link 140 to the BBU 110. The method further comprises obtaining 306 uplink signals y as received at the N antennas 121, 122, 123 from the number of UEs 131, 132, 133, the N uplink signals y comprising K user-layer signals overlaid with interference signals and noise, the N uplink signals further comprising a second reference signal, and receiving 308, from the BBU, information of first beamforming weights $W_1$ calculated from the first reference signal that the RRU sent to the BBU. The method further comprises determining 310 intermediate signals $\tilde{y}$ based on the information of the first beamforming weights $W_1$ and on the uplink signals y, the intermediate signals having K+L components, where (K+L) is smaller than N, and L is larger than or equal to zero, and sending 312 the intermediate signals $\tilde{y}$ over the fronthaul link 140 to the BBU 110.

According to an embodiment, the received 308 information of the first beamforming weights $W_1$ comprises the first beamforming weights in direction domain. Further, the method comprises transforming 309 the first beamforming weights $W_1$ from direction domain into antenna-element domain. Still further, the intermediate signals are determined 310 based on the first beamforming weights transformed into antenna-element domain. By receiving the information of the first beamforming weights $W_1$ in direction domain the information received over the fronthaul could be received in a more compressed form than if received in antenna-element domain. Transmission energy typically has energy concentrated in a limited number of directions. Then a channel estimate in direction domain is often easier to compress than when in antenna-element domain. Hereby less data of the first beamforming weights $W_1$ needs to be sent over the fronthaul link. In order to determine the intermediate signals $\tilde{y}$, the first beamforming weights $W_1$ need to be transformed back to antenna-element domain as the uplink signals are in antenna-element domain y.

According to another embodiment, the first reference signal is a Sounding Reference Signal, SRS.

According to another embodiment, the second reference signal is a Demodulation Reference Signal, DMRS. The DMRS is a reference signal that is embedded in each time slot, i.e. there is at least one DMRS in the same time slot as the uplink signals. Normally, the DMRS is sent using different time-frequency resources, e.g. Resource Elements, than the time-frequency resources used for the uplink data signals in the same slot. The DMRS is a good signal to use as the second signal as it is scheduled in the same slot as the uplink signals and therefore should experience the same channel as the uplink signals. In fact, the DMRS is designed for estimating the current channel to assist the signal demodulation.

According to another embodiment, the received 308 information of the first beamforming weights $W_1$ comprises one or more beamforming indices as predefined in a beamforming codebook, which the RRU has access to. Hereby, only index(-es) need to be sent over the fronthaul instead of the actual weights, and the RRU obtains the first beamforming weights that corresponds to the received codebook indices from the beamforming codebook. Such a codebook-based approach is very efficient for reducing the bits needed to transport over the fronthaul link. The approach is especially advantageous when Signal to Noise Ratio (SNR) is moderate or low.

Figure 4:
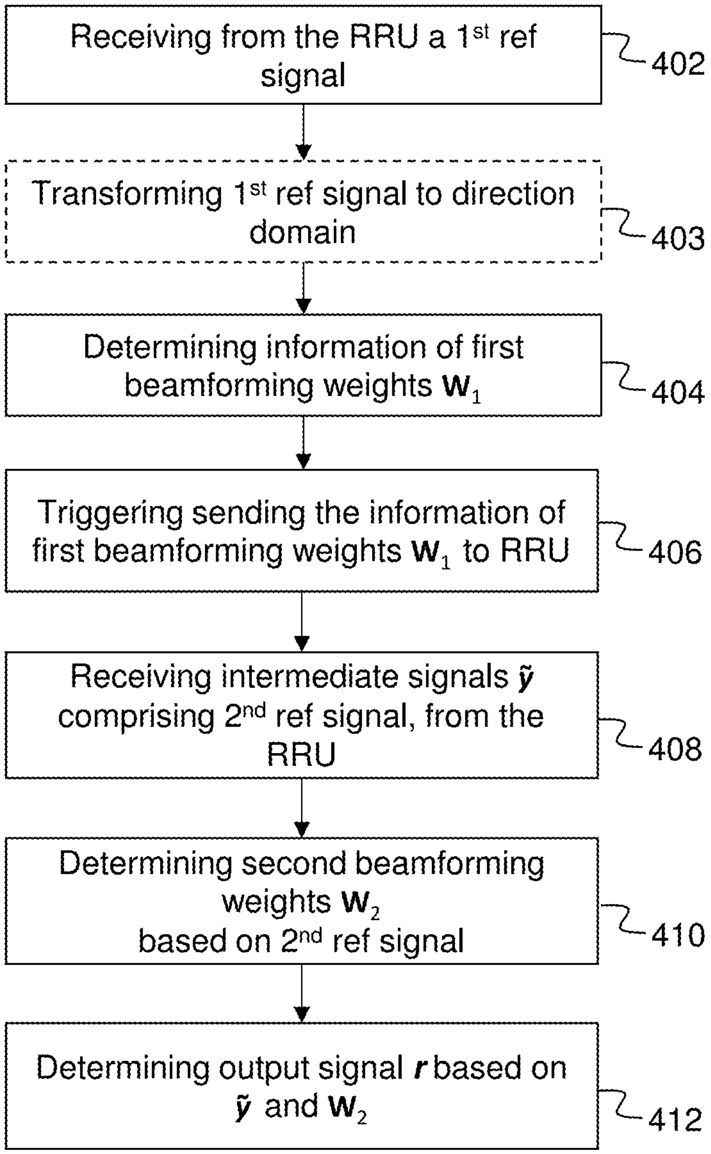
FIG. 4 is a flow chart illustrating a method performed by a BBU, according to possible embodiments.

FIG. 4, in conjunction with FIG. 1, describes a method performed by a BBU system of a wireless communication network. The wireless communication network comprises a distributed base station system 100 having a BBU 110 and an RRU 120 connected to the BBU 110 over a fronthaul link 140. The RRU 120 is further connected to N antennas 121, 122, 123. The method comprises receiving 402, from the RRU 120, a first reference signal that the RRU has received from a number of UEs 131, 132, 133 wirelessly connected to the RRU 120, determining 404 information of first beamforming weights $W_1$ based on the received first reference signal, and triggering sending 406 of the information of the first beamforming weights $W_1$ over the fronthaul link 140 to the RRU 120. The method further comprises receiving 408, from the RRU 120, intermediate signals $\tilde{y}$ determined by the RRU from the information of the first beamforming weights $W_1$ and from uplink signals y as received by the RRU at the N antennas 121, 122, 123 from the number of UEs 131, 132, 133, the intermediate signals having K+L components, where (K+L) is smaller than N, and L is larger than or equal to zero, the N uplink signals y comprising K user-layer signals overlaid with interference signals and noise and a second reference signal, determining 410 second beamforming weights $W_2$ based on the second reference signal, and determining 412 output signals r, which are estimations of the K user-layer signals, based on the received intermediate signals $\tilde{y}$ and the second beamforming weights $W_2$.

The output signals r are then further treated, such as being sent for demodulation at the BBU. The BBU system of the wireless communication network that performs the method may be the BBU 110. Alternatively, the BBU system may be any other network node of the communication network, such as a node further away from the UEs, e.g. another network element in the RAN or close to the RAN or another RAN node. In this alternative, the BBU 110 receives from the RRU 120, the first reference signal and intermediate signals $\tilde{y}$ comprising the second reference signal, and communicates those signals to the other network node that performs the determining steps. Alternatively, the BBU system may be a group of network nodes, wherein functionality for performing the method are spread out over different physical, or virtual, nodes of the network. The latter may be called a "cloud-solution".

According to an embodiment, the determining 404 of the information of the first beamforming weights $W_1$ comprises determining a channel estimation $\hat{H}$ of the wireless communication channel H from the number of UEs 131, 132, 133 to the N antennas 121, 122, 123, based on the first reference signal as received at the N antennas and determining reduced information of the first beamforming weights $W_1$ based on the channel estimation $\hat{H}$. Further, the information of the first beamforming weights $W_1$ that is triggered to be sent 406 to the RRU 120 is the reduced information of the first beamforming weights. As the first beamforming weights $W_1$ are less sensitive to errors compared to the second beamforming weights $W_2$, the first beamforming weights can be compressed in order to save fronthaul capacity. Less sensitive to errors means has less impact on the performance, i.e. on the accuracy of the determining of the output signals r.

According to another embodiment, the method further comprises transforming 403 the first reference signal as received in antenna-element domain at the N antennas from antenna-element domain to direction domain. Further, the information of the first beamforming weights $W_1$ is determined 404 based on the transformed first reference signal. By transforming the received first reference signal into direction domain, the channel estimation quality can be improved. The SNR on the major directions are much larger than that in element domain. Therefore, it can improve the channel estimation quality, and an improved channel estimation quality results in a more accurate determination of the first beamforming weights.

According to another embodiment, the method further comprises determining a reduced channel estimation $\tilde{H}$ of the wireless communication channel H from the number of UEs 131, 132, 133 to the N antennas 121, 122, 123, based on the transformed 403 first reference signal. Further, the information of the first beamforming weights is determined 404 based on the reduced channel estimation $\tilde{H}$ and the information of the first beamforming weights $W_1$ that is triggered to be sent 406 to the RRU 120 is the reduced information of the first beamforming weights. As transmission energy typically has energy concentrated in a limited number of directions, a channel estimate in direction domain is often easier to compress than when in antenna element domain, as there are zeros (or close to zero) in many directions. As the first beamforming weights are determined on the reduced direction domain channel estimation $\tilde{H}$ they can be represented by less bits than if not using such a reduced direction domain channel estimation.

According to another embodiment, the sent reduced information of the first beamforming weights $W_1$ comprises a first matrix part comprising non-zeros of the first beamforming weights $W_1$ determined based on the reduced channel estimation $\tilde{H}$ or the channel estimation $\hat{H}$, and a second matrix part with a bitmap mapping the non-zeros into corresponding locations of the beamforming weights $W_1$.

According to another embodiment, the first reference signal is a Sounding Reference Signal, SRS.

According to another embodiment, the second reference signal is a Demodulation Reference Signal, DMRS.

According to another embodiment, the first beamforming weights $W_1$ are determined 404 based on a Hermitian transpose of a channel estimation $\hat{H}$ of the wireless communication channel from the number of UEs 131, 132, 133 to the N antennas 121, 122, 123, and possibly also on an interference covariance matrix R. The channel estimation $\hat{H}$ and the interference covariance matrix R are based on the first reference signal as received at the RRU. The first beamforming weights are used by the RRU to combine signals from the respective antenna into beams, the number of beams being equal to the number of user-layers. In other words, the number of signal components to be sent over the fronthaul are limited from N to K+L. The Hermitian transpose is like implementing MRC on the uplink signal.

According to another embodiment, the second beamforming weights $W_2$ are determined 410 based on an inverse of an estimation of an effective channel including the wireless communication channel H from the number of UEs 131, 132, 133 to the N antennas 121, 122, 123 multiplied with the first beamforming weights $W_1$, the estimation of the effective channel being based on the second reference signal. The effective channel is estimated based on the second reference signal as it looks when sent from the UEs and on the second reference signal as it looks when received at the BBU, after being multiplied with the first beamforming weights $W_1$ in the RRU.

According to another embodiment, the first beamforming weights are determined within a beamforming codebook. Further, the information of the first beamforming weights that are sent 406 over the fronthaul link 140 to the RRU 120 is one or more beamforming indices that correspond to the determined first beamforming weights. By sending one or more indices instead of the actual weights, the data needed to be sent over the fronthaul is lowered. The beamforming indices are predefined in a beamforming codebook that the RRU has access to, so that the RRU can decode the one or more received indices into beamforming weights.

In the following, an embodiment of splitting beamforming between the RRU and the BBU according to the invention is described. The embodiment uses ZF-based and MMSE-based beamforming as two different examples to mathematically explain the invention.

Consider the scenario with K user layers in a desired cell. The wireless communication channel from the target UE(s) to the RRU is denoted as $H\in\mathbb{C}^{N\times K}$, where N is the number of antennas of the RRU. Let $W\in\mathbb{C}^{K\times N}$ denote the uplink beamforming weights with respect to H. The ideal ZF-based beamforming weights can be expressed as $$W_{ZF}=(H^H H)^{-1}H^H.$$

where $H^H$ denote the Hermitian transpose of H. For MMSE-based beamforming, the beamforming weights can be expressed as $$W_{MMSE}=(H^H H+\sigma^2 I)^{-1}H^H.$$

where $\sigma^2$ is a measure of noise (or error terms) and I is a K×K identity matrix.

In both examples, W can be decomposed into two parts as $W=W_2W_1$, where $W_1$ represents first beamforming weights of a first beamforming part and $W_2$ represents second beamforming weights of a second beamforming part.

For both the ZF-based method and the MMSE-based method, the first beamforming weights are determined as $W_1=\hat{H}^H$, where $\hat{H}$ denote the estimation of the wireless communication channel H. In this invention, the BBU estimates $\hat{H}$ using a received SRS, calculates $W_1=\hat{H}^H$ and then sends $W_1$ to the RRU. The first beamforming part is then performed in the RRU based on the first beamforming weights $W_1$, which can be interpreted as applying a maximum-ratio combining (MRC) operation with respect to the channel estimation $\hat{H}$. The first beamforming weights $W_1$ is a matrix composed of K×N complex values.

The second beamforming part performs interference mitigation between user layers. The second beamforming weights $W_2$, can be described as a matrix composed of K×K complex values. For the ZF-method, $W_{2,ZF}$ $(\hat{H}_{eff})^{-1}$, where $\hat{H}_{eff}$ is the channel estimation of the effective channel $\hat{H}_{eff}=W_1H$ including the first beamforming part performed in the RRU. For MMSE-based beamforming, $$W_{2,MMSE}=(\hat{H}_{eff}+\sigma^2 I)^{-1}.$$

For both cases, the BBU estimates $\hat{H}_{eff}$ using the received DMRS which is already processed by the first beamforming part in RRU.

Considering the features of the first beamforming weights $W_1$ and the second beamforming weights $W_2$ respectively, embodiments of this invention splits the ZF/MMSE-based beamforming in two parts. The first beamforming part in the RRU implements MRC by multiplying $W_1$ to the received uplink signal y, which reduces the signal stream from N to K signal components. The BBU then carries out the second beamforming part to realize interference rejection/mitigation by multiplying $W_2$ to the intermediate signals $\tilde{y}$ received from the RRU over the FH interface. Importantly, the second beamforming part can be more accurate due to using the more accurate channel estimation based on the DMRS. Further, calculation of $W_1$ in BBU is kept simple, not involving any computational intensive operations, like matrix inversion.

The invention is not limited to the examples of ZF and MMSE. The first part of beamforming $W_1$ does not have to be a K×N matrix. It may be a $$(K+L)\times N$$

matrix, where $$0\leq L<N-K.$$

As another example, the Interference Rejection Combining (IRC)-MMSE method may be used. For the IRC-MMSE method, $W_1$ may be determined not only based on the channel estimation $\hat{H}$ but also on the information on the interference covariance matrix R, which are both determined based on the first reference signals. The interference covariance matrix R contains statistical information regarding the inter-cell interferences, i.e. the interferences from other cells. This makes the intermediate signals $\tilde{y}$ comprise of L extra FH streams, which contain more degrees of freedoms. This allows the second beamforming part to have sufficient degrees of freedom to mitigate both intra-cell and inter-cell interferences, e.g. using the IRC-MMSE method, given the knowledge of the effective channel, e.g. estimated from the second reference signals.

Figure 5:
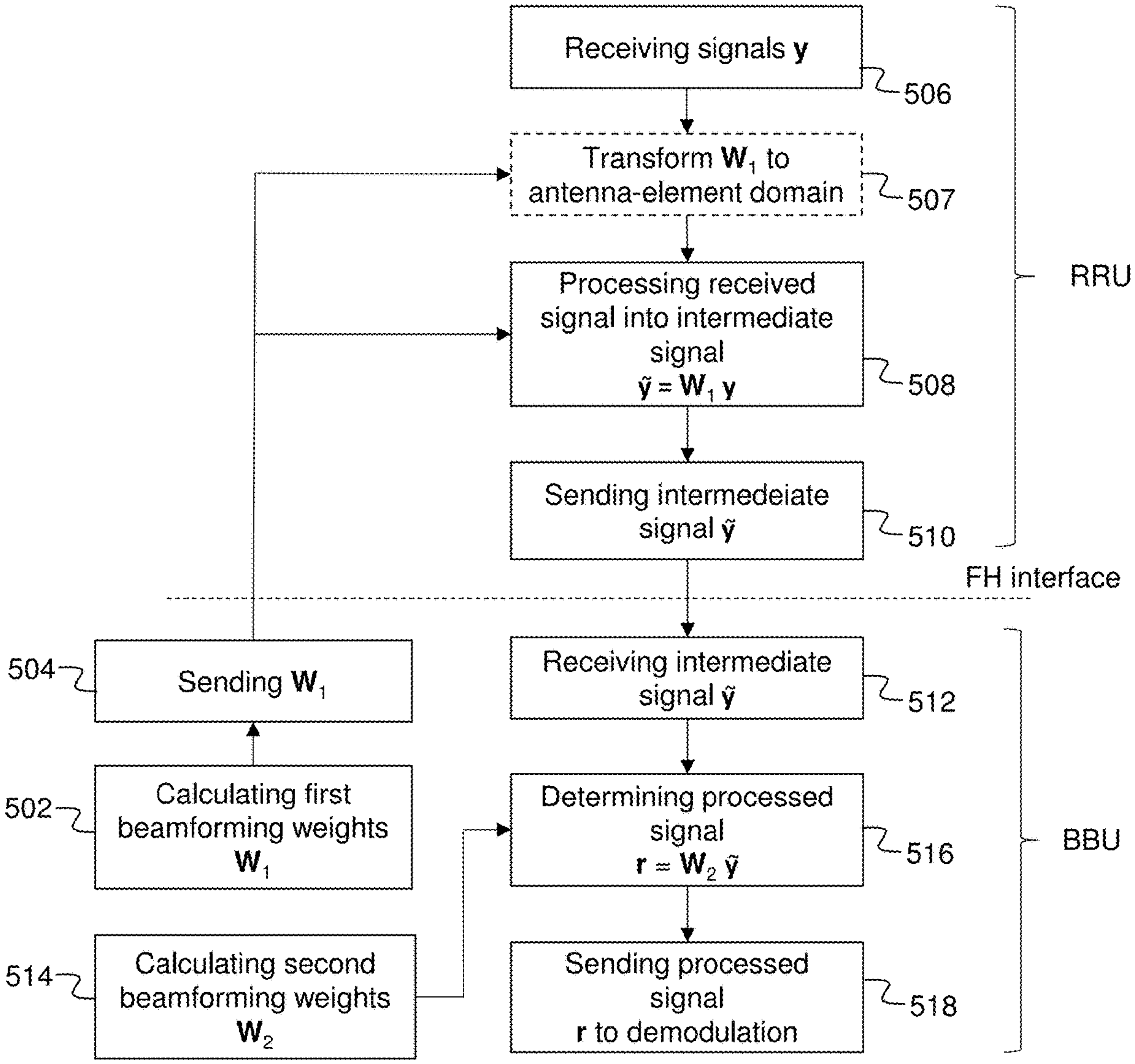
FIG. 5 is a flow chart illustrating a method for handling uplink signals in a distributed base station system according to other possible embodiments.

FIG. 5 shows an embodiment of a method for handling uplink signals in a distributed base station system comprising an RRU and a BBU connected via a fronthaul (FH) interface. Uplink signals y are received 506 at N antennas (or antenna elements) of the RRU from a number of UEs. The uplink signals comprise K user layer signals. The uplink signals y as received at the N antennas are denoted as $$y=[y_1,y_2,\ldots,y_n,\ldots,y_N]^T,\text{ where }[y_1,y_2,\ldots,y_N]^T$$

is the transpose of vector $[y_1, y_2, \ldots, y_N]^T$ and $y_n$ is the received uplink signal at the n-th antenna element. In the meantime, the BBU calculates 502 first beamforming weights (aka coefficients) $W_1$ based on an uplink channel estimation $\hat{H}$, of the wireless communication channel H between the number of UEs and the RRU, wherein the estimation $\hat{H}$ may be based on an SRS sent by the number of UEs. The BBU sends 504 the calculated first beamforming weights $W_1$ to the RRU. According to an embodiment, only a subset of the first beamforming weights $W_1$ can be sent 504 to the RRU to reduce the occupied transport capacity on the FH interface. As described earlier, $W_1$ may also be determined on the information of the interference covariance matrix R, which is also estimated from SRS.

The RRU receives the first beamforming weights $W_1$, or as in an embodiment a subset of the weights in $W_1$, from the BBU, and processes 508 the received uplink signals y into intermediate signals $\tilde{y}$, i.e. performs the first beamforming part based on $W_1$ to generate the intermediate signals $\tilde{y}=W_1y$ described as $$\tilde{y} = [\tilde{y}_1, \tilde{y}_2, \ldots, \tilde{y}_k, \ldots, \tilde{y}_{K+L}]^T,$$

where $\tilde{y}_k$ is the signal to be transmitted on the k-th FH stream. According to an embodiment, if the first beamforming weights $W_1$ is provided in direction domain, aka beam domain, the RRU first transforms 507 the weights from beam domain to antenna-element domain before applying them to the received uplink signals y to perform the first beamforming part. The RRU then sends 510 the intermediate signals $\tilde{y}$ to the BBU over the FH interface.

The BBU receives 512 the intermediate signals $\tilde{y}$ from the RRU over the FH interface and calculates 514 the second beamforming weights $W_2$. According to an embodiment, the second beamforming weights $W_2$ are calculated 514 based on a channel estimation performed using a DMRS received together with the uplink signals y. The BBU performs the second beamforming part based on the second beamforming weights $W_2$ by determining 516 a processed signal, which is an estimation $r=[r_1, r_2, \ldots, r_K]^T$ of the K user-layer signals. The processed signal is determined by $r=W_2\tilde{y}$. The processed signal r is then sent 518 for further processing, such as demodulation.

Figure 6:
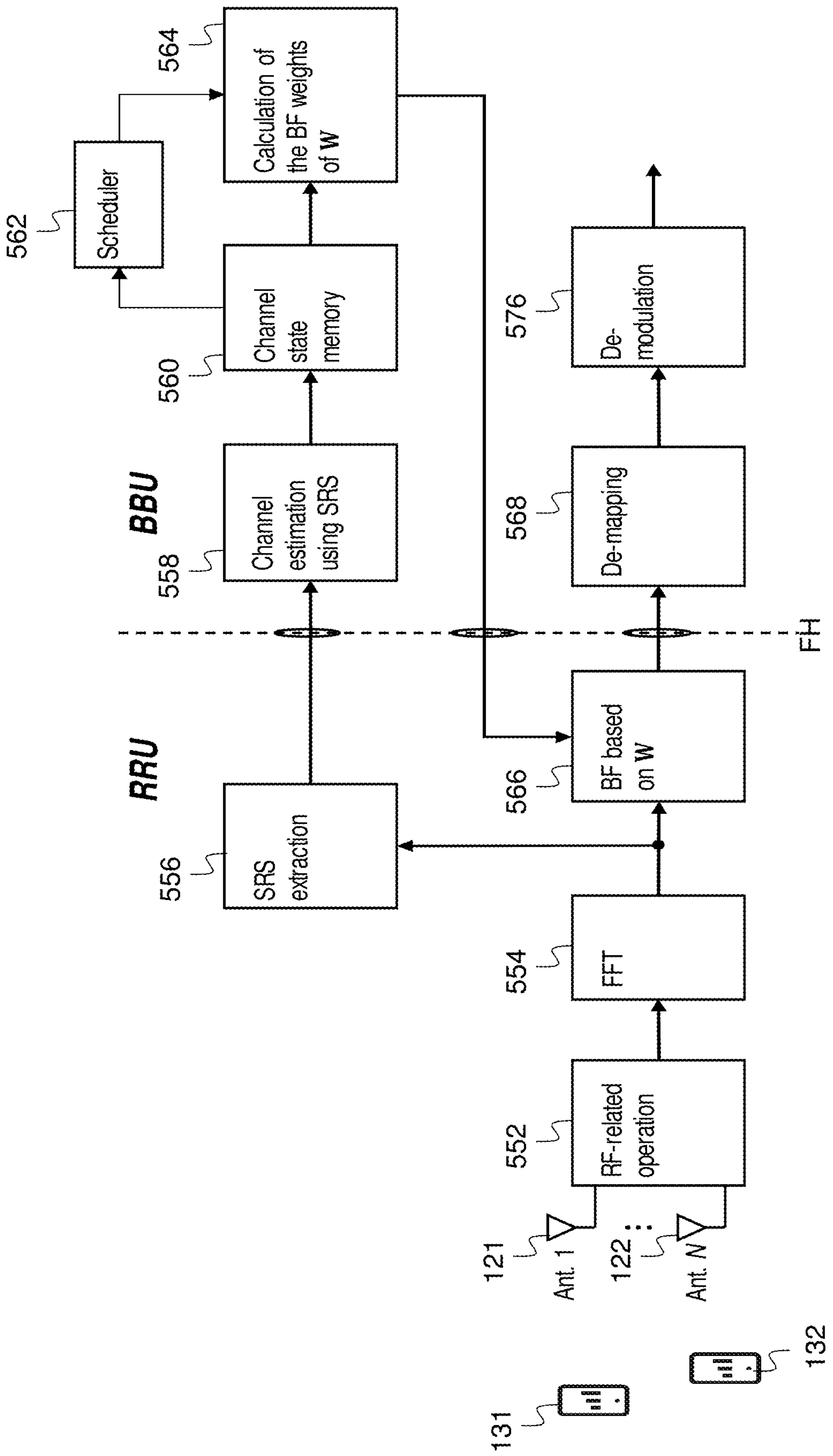
FIG. 6 is a schematic block diagram of a split of functionalities between the RRU and the BBU according to prior art.

FIG. 6 shows implementation blocks in a distributed base station according to prior art. In prior art, uplink signals y are received at N antennas 121, 122 of the RRU from UEs 131, 132 over a time period. An RF block 552 performs RF-related operations, such as signal amplification, frequency down-conversion, analog-to-digital conversion etc. on the received uplink signals, and an FFT block 554 performs Fast Fourier Transformation on the received signals to transform them into the frequency domain. Thereafter, an SRS extraction block 556 extracts an SRS from the received signals. The extracted SRS is sent over the fronthaul FH to the BBU. The BBU performs channel estimation based on the received SRS in a first block 558. The channel estimation is sent from the first block 558 to a channel state memory 560, which stores the channel estimation of multiple UEs. A scheduler 562 uses the channel estimations stored in the memory to determine how to schedule the UEs. For example, which UEs are to send in the next slot, how resource elements are allocated to these UEs, which UEs are scheduled to the same resource elements for Multiuser Multiple Input Multiple Output (MU-MIMO), what modulation and coding schemes these UEs will use, etc. The BBU further comprises a calculation unit 564 that calculates beamforming weights W from the channel estimation. The calculated beamforming weights W are sent back over the fronthaul to a beamforming block 566 of the RRU that performs beamforming on the uplink signal based on the calculated beamforming weights and sends the beamformed uplink signal over the fronthaul again to a de-mapping block 568 and a de-modulation block 576 of the BBU that perform de-mapping and de-modulation, respectively, on the beamformed signal received over the fronthaul.

In LTE, the SRS is either transmitted periodically or aperiodically. The periodicity of periodic SRS transmission ranges from 2 ms, i.e. every second subframe, to 160 ms, i.e. every $16^{th}$ frame. The aperiodic SRS transmission is configured by higher layer signaling. In NR, the SRS can be configured for periodic, semi-persistent, or aperiodic transmission. When SRS-based channel estimation is used for the whole beamforming as in prior art, the beamforming weights are not with respect to the current channel due to the limited SRS availability and processing delay. As observed in FIG. 6, the provided beamforming weights are solely calculated based on the estimated channel "in the past" obtained from the channel state memory 560. This will lead to a mismatch between the applied weights and the actual channel. This can cause significant performance degradation in a fast time-varying channel environment.

Figure 7:
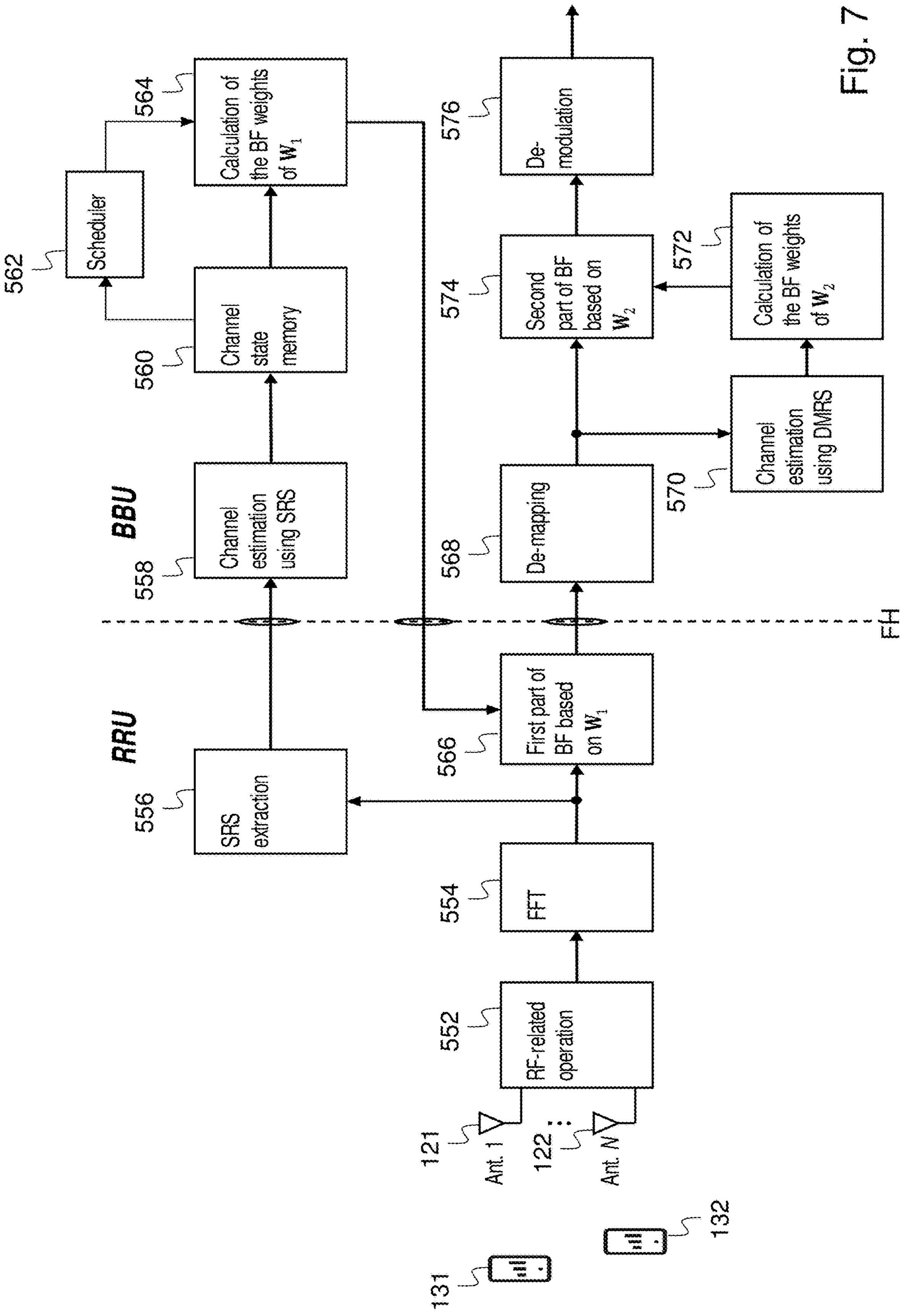
FIG. 7 is a schematic block diagram of another type of split of functionalities between the RRU and the BBU, according to embodiments of the invention.

FIG. 7, on the other hand, shows implementation blocks according to an embodiment of the invention. In FIG. 7 compared to FIG. 6, like numerals refer to like functions. However, the calculation unit 564 only calculates a first part of the beamforming weights $W_1$ based on the SRS and sends them back to the RRU, and likewise, the beamforming block 566 performs only a first part of the beamforming of the uplink signal based on the first beamforming weights so that an intermediate signal is calculated. The intermediate signal is then de-mapped in the BBU by the de-mapping block 568. Then, out of the intermediate signal, a DMRS is extracted and sent to a DMRS channel estimating block 570 that performs channel estimation using the DMRS. Then a second calculation block 572 calculates second beamforming weights $W_2$ based on the channel estimation performed by the channel estimation block 570. The intermediate signal is then beamformed in a beamforming block 574 of the BBU based on the second beamforming weights into an output signal that is sent for de-modulation in the de-modulation block 576. Comparing to the prior art of FIG. 6, which relies the whole beamforming weight calculation on the mismatched channel information extracted from the SRS, the embodiment of FIG. 7 only has the first beamforming impacted by the SRS. Instead, the embodiment of FIG. 7 has the second beamforming implemented in the BBU based on DMRS channel estimation, which can be provided in a timelier manner, and therefore has better performance.

To have beamforming conducted, either completely or partially, in the RRU, the beamforming weights need to be transported from the BBU to the RRU, since channel estimation is performed in the BBU, to save complexity in the RRU. For the ZF/MMSE method, both prior art beamforming weights W and first part beamforming weights $W_1$ according to the embodiment are composed of K×N complex values. Comparing to the prior art which transports W and performs the complete beamforming in RRU, an advantage of this invention which transports only the first beamforming weights $W_1$ and performs part of beamforming in RRU is that the first beamforming weights $W_1$ have good properties in direction/beam domain that can be exploited for compression.

In this example, the first beamforming weights $W_1$ are determined based on the Hermitian transpose of the uplink channel estimation. The element-domain channel is typically with low SNR and low correlation, which limits the estimation performance. An additional step could be taken to transform the channel into direction domain, aka beam domain, for better harnessing the spatial correlation. The directional channel typically has the energy concentrated in a limited number of entries, where the number is much smaller than N×K. This is due to the fact that signals coming from a certain UE are typically concentrated in certain directions while leaving the other directions more or less unused.

In one embodiment of this invention, the SRS-based channel estimation in direction/beam domain, denoted as $\hat{H}_d$, is approximated by a reduced direction/beam-domain channel estimation $\tilde{H}$. For each column k of $\tilde{H}$, the R entries indexed by $U_k$, where $U_k$ is a set of R unique indices ranging from 1 to N, are equal to the R selected entries in the k-th column of $\hat{H}_d$ indexed by $U_k$, whereas other entries in column k of $\tilde{H}$ are equal to 0. The selection of indices in $U_k$ for column k fulfills at least two criteria:

The number of selected entries, R, is larger than or equal to the total number of user layers, K. This criterion guarantees that the effective channel after the first beamforming is well-conditioned for matrix inversion which will be used in the cancellation phase at the BBU.

The selected entries of column k in the direction/beam-domain estimated channel $\hat{H}_d$ should contain most energy of that column, for example, by selecting the R entries with largest power values. This criterion makes sure that the system captures enough energy for each user layer.

The first beamforming weights $W_1$ are thereby determined as the Hermitian transpose of the reduced direction/beam-domain channel estimation, i.e., $W_1=\tilde{H}^H$.

Since now $W_1$ is a sparse matrix, i.e., with many zero entries, it can be effectively compressed before sending over the FH to the RRU. One embodiment of implementing the compression is to inform $W_1$ to the RRU as two different parts. The first part is a R×K matrix containing the non-zero entries of $W_1$, while the second part is an N×K bitmap with "0" and "1" mapping the non-zero entries to corresponding locations in $W_1$. The RRU needs to re-construct $W_1$ with the received two-part information.

A numerical example of advantage in transporting $W_1$ as described above instead of W is as follows: Assume that the number of antennas at the base station is N=64, the number of user layers is K=16 and the target number of selected directions per user layer is R=16. Each complex number is transported with 16 bits. In this case, transporting W needs $$(64\times 16)\times 16 = 16384$$

bits per group of subcarriers (e.g., per RB or per a group of RBs);

transporting $W_1$ needs $$\underbrace{(16\times 16)\times 16}_{Non-zero\ values} + \underbrace{(64\times 16)\times 1}_{bitmap} = 5120$$

bits per group of Non-zero values bitmap subcarriers (e.g., per RB or per a group of RBs).

As a result, the FH traffic load to transport the beamforming weights is saved by 68%. In addition, it is observed that using $W_1$ based on the reduced direction/beam-domain channel estimation may improve the performance when the directions with large channel estimation error are excluded in the process of entry selection.

Figure 8:
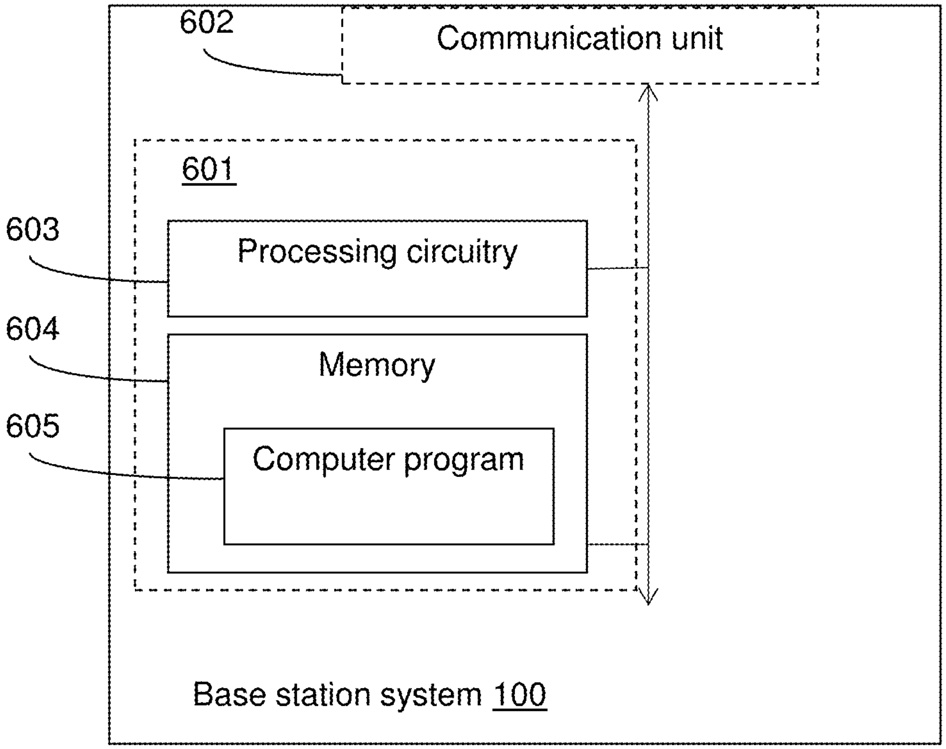
FIG. 8 is a block diagram illustrating a distributed base station system in more detail, according to further possible embodiments.

FIG. 8, in conjunction with FIG. 1, describes a distributed base station system 100 operable in a wireless communication network. The distributed base station system 100 comprises a BBU 110 and an RRU 120 connected to each other over a fronthaul link 140. The RRU 120 is connected to N antennas 121, 122, 123. The distributed base station system 100 comprises a processing circuitry 603 and a memory 604. Said memory contains instructions executable by said processing circuitry, whereby the distributed base station system 100 is operative for receiving, by the RRU, a first reference signal from a number of UEs 131, 132, 133, wirelessly connected to the RRU 120, and sending, by the RRU, the first reference signal over the fronthaul link 140 to the BBU 110. The distributed base station system 100 is further operative for determining, by a BBU system, information of first beamforming weights $W_1$ based on the first reference signal and sending, by the BBU, the information of the first beamforming weights $W_1$ over the fronthaul link 140 to the RRU 120. The distributed base station system 100 is further operative for obtaining, by the RRU, uplink signals y as received at the N antennas 121, 122, 123 from the number of UEs 131, 132, 133, the N uplink signals y comprising K user-layer signals overlaid with interference signals and noise, the N uplink signals further comprising a second reference signal, and determining, by the RRU, intermediate signals j based on the information of the first beamforming weights $W_1$ and on the uplink signals y comprising the second reference signal, the intermediate signals having K+L signal components, where (K+L) is smaller than N, and L is larger than or equal to zero. The distributed base station system 100 is further operative for sending, by the RRU, the intermediate signals $\tilde{y}$ over the fronthaul link 140 to the BBU 110, determining, by the BBU system, second beamforming weights $W_2$ based on the second reference signal received in the intermediate signal $\tilde{y}$, and determining, by the BBU system, output signals r, which are estimations of the K user-layer signals, based on the received intermediate signals $\tilde{y}$ and the second beamforming weights $W_2$.

According to other embodiments, the distributed base station system 100 may further comprise a communication unit 602, which may be considered to comprise conventional means for wireless communication with the wireless communication devices 131, 132, 133, such as a transceiver for wireless transmission and reception of signals. The communication unit 602 may also comprise conventional means for communication with other radio access network nodes of the wireless communication network 100 and with the core network 150. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a microprocessor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the distributed base station system 100 to perform the steps described in any of the described embodiments of the distributed base station system 100 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the distributed base station system 100 has access via the communication unit 602. The computer program 605 may then be downloaded from the server into the memory 604.

Figure 9:
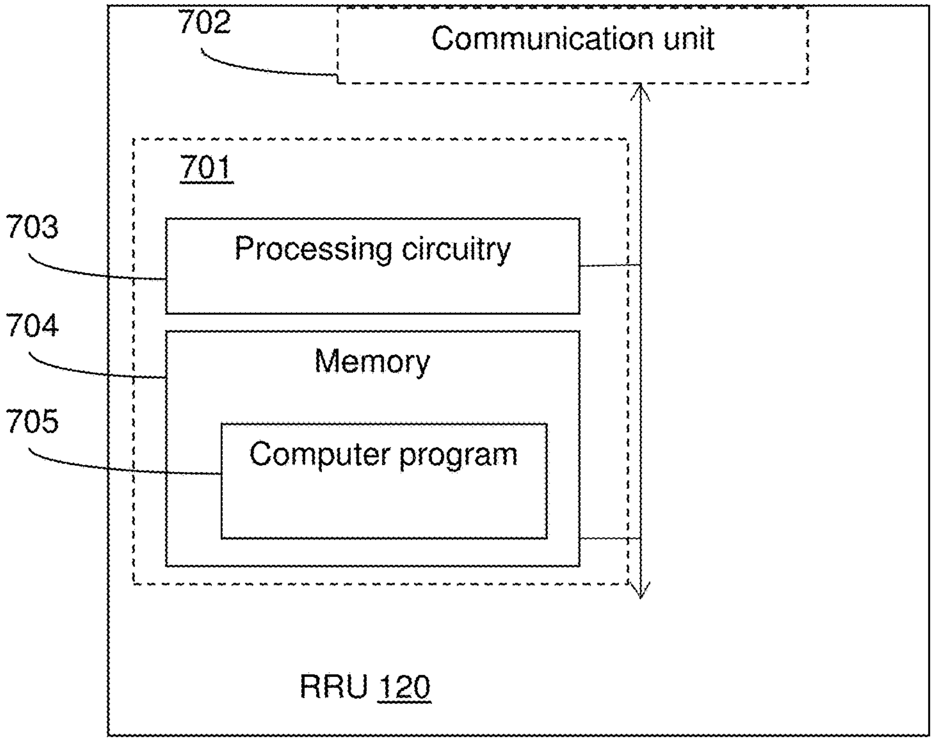
FIG. 9 is a block diagram illustrating an RRU in more detail, according to further possible embodiments.

FIG. 9, in conjunction with FIG. 1, describes an RRU 120 operable in a distributed base station system 100 of a wireless communication network. The distributed base station system 100 further comprises a BBU 110 connected to the RRU over a fronthaul link 140. The RRU 120 is operable to be connected to N antennas 121, 122, 123. The RRU 120 comprises a processing circuitry 703 and a memory 704. Said memory contains instructions executable by said processing circuitry, whereby the RRU 120 is operative for receiving a first reference signal from a number of UEs 131, 132, 133 wirelessly connected to the RRU, and sending the first reference signal over the fronthaul link 140 to the BBU 110. The RRU 120 is further operative for obtaining uplink signals y as received at the N antennas 121, 122, 123 from the number of UEs 131, 132, 133, the N uplink signals y comprising K user-layer signals overlaid with interference signals and noise, the N uplink signals further comprising a second reference signal. The RRU 120 is further operative for receiving, from the BBU, information of first beamforming weights $W_1$ calculated from the first reference signal that the RRU sent to the BBU, determining intermediate signals $\tilde{y}$ based on the information of the first beamforming weights $W_1$ and on the uplink signals y, the intermediate signals having K+L components, where (K+L) is smaller than N, and L is larger than or equal to zero, and sending the intermediate signals $\tilde{y}$ over the fronthaul link 140 to the BBU 110.

According to an embodiment, the received information of the first beamforming weights $W_1$ comprises the first beamforming weights in direction domain. Further, the RRU is operative for transforming the first beamforming weights $W_1$ from direction domain into antenna-element domain, and for determining the intermediate signals based on the first beamforming weights transformed into antenna-element domain.

According to other embodiments, the RRU 120 may further comprise a communication unit 702, which may be considered to comprise conventional means for wireless communication with the wireless communication devices 131, 132, 133, such as a transceiver for wireless transmission and reception of signals. The communication unit 702 may also comprise conventional means for communication with the BBU 110 over the fronthaul link 140. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a microprocessor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the RRU 120 to perform the steps described in any of the described embodiments of the RRU 120 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the RRU 120 has access via the communication unit 702. The computer program 705 may then be downloaded from the server into the memory 704.

Figure 10:
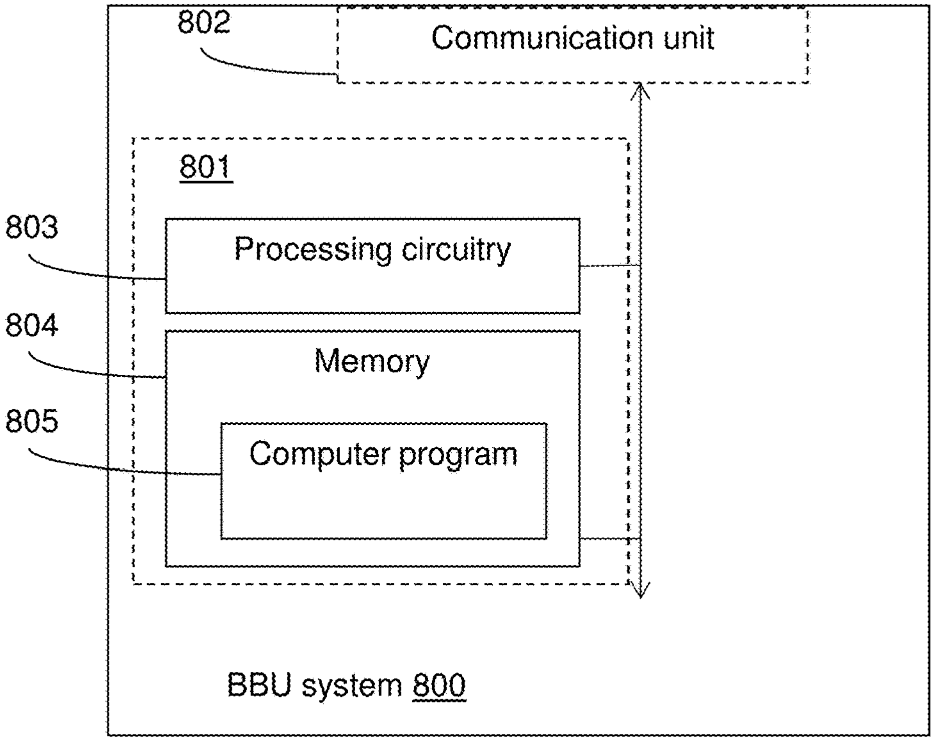
FIG. 10 is a block diagram illustrating a BBU system in more detail, according to further possible embodiments.

FIG. 10, in conjunction with FIG. 1, describes a BBU system 800 operable in a wireless communication network. The wireless communication network comprises a distributed base station system 100 having a BBU 110 and an RRU 120 connected to the BBU over a fronthaul link 140. The RRU has N antennas 121, 122, 123. The BBU system 800 comprises a processing circuitry 803 and a memory 804. Said memory contains instructions executable by said processing circuitry, whereby the BBU system 800 is operative for receiving, from the RRU 120, a first reference signal that the RRU has received from a number of UEs 131, 132, 133 wirelessly connected to the RRU 120, determining information of first beamforming weights $W_1$ based on the received first reference signal, and triggering sending of the information of the first beamforming weights $W_1$ over the fronthaul link 140 to the RRU 120. The BBU system 800 is further operative for receiving, from the RRU 120, intermediate signals $\tilde{y}$ determined by the RRU from the information of the first beamforming weights $W_1$ and from uplink signals y as received by the RRU at the N antennas 121, 122, 123 from the number of UEs 131, 132, 133, the intermediate signals having K+L components, where (K+L) is smaller than N, and L is larger than or equal to zero, the N uplink signals y comprising K user-layer signals overlaid with interference signals and noise and a second reference signal. The BBU system is further operative for determining second beamforming weights $W_2$ based on the second reference signal, and determining output signals r, which are estimations of the K user-layer signals, based on the received intermediate signals $\tilde{y}$ and the second beamforming weights $W_2$.

The BBU system may be the actual BBU 110, or at least a part of the BBU 110. Alternatively, the BBU system may be any other network node of the wireless communication network, such as a node further away from the UE, e.g. another network element in the RAN or close to the RAN or another RAN node. In this alternative, the BBU 110 receives from the RRU 120, the intermediate signals $\tilde{y}$, as well as the first reference signal, and communicates them to the other network node that performs the determining of information of first and second beamforming weights $W_1$. Alternatively, the BBU system may be a group of network nodes, wherein BBU system functionality is spread out over different physical, or virtual, nodes of the network. The latter may be called a "cloud-solution".

According to an embodiment, the BBU system 800 is operative for determining of the information of the first beamforming weights $W_1$ by determining a channel estimation $\hat{H}$ of the wireless communication channel from the number of UEs 131, 132, 133 to the N antennas 121, 122, 123, based on the first reference signal as received at the N antennas; and determining reduced information of the first beamforming weights $W_1$ based on the channel estimation $\hat{H}$. Further, the BBU system 800 is operative for triggering to send the information of the first beamforming weights $W_1$ to the RRU 120 by sending the reduced information of the first beamforming weights.

According to another embodiment, the BBU system 800 is further operative for transforming the first reference signal as received in antenna-element domain at the N antennas from antenna-element domain to direction domain. Also, the BBU system is operative for determining the information of the first beamforming weights $W_1$ based on the transformed first reference signal.

According to another embodiment, the BBU system 800 is further operative for determining a reduced channel estimation $\tilde{H}$ of the wireless communication channel from the number of UEs 131, 132, 133 to the N antennas 121, 122, 123 based on the transformed first reference signal. Also, the BBU system is operative for determining the information of the first beamforming weights based on the reduced channel estimation $\tilde{H}$ and operative for triggering to send the information of the first beamforming weights $W_1$ by triggering to send the reduced information of the first beamforming weights to the RRU.

According to another embodiment, the BBU system 800 is operative for determining the first beamforming weights $W_1$ based on a Hermitian transpose of a channel estimation $\hat{H}$ of the wireless communication channel from the number of UEs 131, 132, 133 to the N antennas 121, 122, 123, and possibly also on an interference covariance matrix R, the channel estimation N and the interference covariance matrix R being based on the first reference signal as received at the RRU.

According to another embodiment, the BBU system 800 is operative for determining the second beamforming weights $W_2$ based on information on an estimation of an effective channel including the wireless communication channel H from the number of UEs 131, 132, 133 to the N antennas 121, 122, 123 multiplied with the first beamforming weights $W_1$, the estimation of the effective channel being based on the second reference signal.

According to other embodiments, the BBU system 800 may further comprise a communication unit 802, which may be considered to comprise conventional means for communication with the RRU 120 over the fronthaul link 140 and for communication with other nodes 150 of the wireless communication network. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a microprocessor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the BBU system 800 to perform the steps described in any of the described embodiments of the BBU system 800 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity to which the BBU system 800 has access via the communication unit 802. The computer program 805 may then be downloaded from the server into the memory 804

According to other embodiments, the radio access network node 140 may further comprise a communication unit 602, which may be considered to comprise conventional means for wireless communication with the wireless communication devices 130, such as a transceiver for wireless transmission and reception of signals. The communication unit 602 may also comprise conventional means for communication with other radio access network nodes of the wireless communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a microprocessor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the radio access network node 140 to perform the steps described in any of the described embodiments of the radio access network node 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the radio access network node 140 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

What is claimed is:

1. A remote radio unit (RRU) of a distributed base station system of a wireless communication network, wherein the distributed base station system further comprising a base band unit (BBU) connected to the RRU, the RRU comprising:

processing circuitry; and a memory containing instructions which, when executed by the processing circuitry, cause the RRU to:

receive a first reference signal from at least one user equipment (UE);

send the first reference signal to the BBU;

obtain uplink signals y received at N antennas from the at least one UE;

receive, from the BBU, information regarding first beamforming weights based on the first reference signal sent to the BBU;

determine intermediate signals y based on the information regarding the first beamforming weights and the uplink signals y; and send a second reference signal comprised in the intermediate signals y to the BBU for determination of second beamforming weights based on the second reference signal.

2. The RRU of claim 1, further comprising transforming the first reference signal received at N antennas from antenna-element domain to direction domain, wherein the information regarding first beamforming weights is based on the direction domain.

3. The RRU of claim 2, wherein the information regarding the first beamforming weights is based on reduced channel estimation, in which the information regarding first beamforming weights is reduced information regarding first beamforming weights.

4. The RRU of claim 2, wherein the information regarding the first beamforming weights provides a subset of all beamforming weights available.

5. The RRU of claim 2, wherein the information regarding the first beamforming weights pertains to a subset of beam direction in the direction domain.

6. A non-transitory computer-readable storage medium comprising instructions which, when executed by processing circuitry of a remote radio unit (RRU) of a distributed base station system of a wireless communication network, wherein the distributed base station system further comprising a base band unit (BBU) connected to the RRU, cause the RRU to perform operations comprising:

receiving a first reference signal from at least one user equipment (UE);

sending the first reference signal to the BBU;

obtaining uplink signals y received at N antennas from the at least one UE;

receiving, from the BBU, information regarding first beamforming weights based on the first reference signal sent to the BBU;

determining intermediate signals y based on the information regarding the first beamforming weights and the uplink signals y; and sending a second reference signal comprised in the intermediate signals y to the BBU for determination of second beamforming weights based on the second reference signal.

7. The non-transitory computer-readable storage medium of claim 6, further comprising transforming the first reference signal received at N antennas from antenna-element domain to direction domain, wherein the information regarding first beamforming weights is based on the direction domain.

8. The non-transitory computer-readable storage medium of claim 7, wherein the information regarding the first beamforming weights is based on reduced channel estimation, in which the information regarding first beamforming weights is reduced information regarding first beamforming weights.

9. The non-transitory computer-readable storage medium of claim 7, wherein the information regarding the first beamforming weights provides a subset of all beamforming weights available.

10. The non-transitory computer-readable storage medium of claim 7, wherein the information regarding the first beamforming weights pertains to a subset of beam direction in the direction domain.

11. A base band unit (BBU) of a distributed base station system of a wireless communication network, wherein the distributed base station system further comprising a remote radio unit (RRU) connected to the BBU, the BBU comprising:

processing circuitry; and a memory containing instructions which, when executed by the processing circuitry, cause the BBU to:

receive, from the RRU, a first reference signal obtained at the RRU from at least one user equipment (UE);

determine information regarding first beamforming weights based on the first reference signal;

trigger to send the information regarding first beamforming weights to the RRU;

receive, from the RRU, a second reference signal comprised in intermediate signals ỹ, wherein the intermediate signals ỹ is determined by the RRU from uplink signals y received at N antennas from the at least one UE at the RRU with the information regarding first beamforming weights;

determine second beamforming weights from the second reference signal comprised in the intermediate signals ỹ; and determine output signals r, based on the intermediate signals ỹ and the second beamforming weights.

12. The BBU of claim 11, further comprising transforming the first reference signal received at N antennas from antenna-element domain to direction domain, wherein the information regarding first beamforming weights is based on the direction domain.

13. The BBU of claim 12, wherein the information regarding the first beamforming weights is based on reduced channel estimation, in which the information regarding first beamforming weights is reduced information regarding first beamforming weights.

14. The BBU of claim 12, wherein the information regarding the first beamforming weights provides a subset of all beamforming weights available.

15. The BBU of claim 12, wherein the information regarding the first beamforming weights pertains to a subset of beam direction in the direction domain.

16. A non-transitory computer-readable storage medium comprising instructions which, when executed by processing circuitry of a base band unit (BBU) of a distributed base station system of a wireless communication network, wherein the distributed base station system further comprising a remote radio unit (RRU) connected to the BBU, cause the BBU to perform operations comprising:

receiving, from the RRU, a first reference signal obtained at the RRU from at least one user equipment (UE);

determining information regarding first beamforming weights based on the first reference signal;

triggering to send the information regarding first beamforming weights to the RRU;

receiving, from the RRU, a second reference signal comprised in intermediate signals $\tilde{y}$, wherein the intermediate signals $\tilde{y}$ is determined by the RRU from uplink signals y received at N antennas from the at least one UE at the RRU with the information regarding first beamforming weights;

determining second beamforming weights from the second reference signal comprised in the intermediate signals $\tilde{y}$; and determining output signals r, based on the intermediate signals y and the second beamforming weights.

17. The non-transitory computer-readable storage medium of claim 16, further comprising transforming the first reference signal received at N antennas from antenna-element domain to direction domain, wherein the information regarding first beamforming weights is based on the direction domain.

18. The non-transitory computer-readable storage medium of claim 17, wherein the information regarding the first beamforming weights is based on reduced channel estimation, in which the information regarding first beamforming weights is reduced information regarding first beamforming weights.

19. The non-transitory computer-readable storage medium of claim 17, wherein the information regarding the first beamforming weights provides a subset of all beamforming weights available.

20. The non-transitory computer-readable storage medium of claim 17, wherein the information regarding the first beamforming weights pertains to a subset of beam direction in the direction domain.

* * * * *